United States Patent
Bouazizi et al.

(10) Patent No.: US 9,882,937 B2
(45) Date of Patent: Jan. 30, 2018

(54) COMMUNICATION RECEIVER (71) Applicant: Huawei Technologies Co., Ltd., Shenzhen (CN)

(72) Inventors: Imed Bouazizi, Munich (DE); Giovanni Cordara, Munich (DE); Lukasz Kondrad, Munich (DE)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 210 days.

(21) Appl. No.: 14/695,452

(22) Filed: Apr. 24, 2015

(65) Prior Publication Data
US 2015/0229676 A1    Aug. 13, 2015

Related U.S. Application Data (63) Continuation of application No. PCT/EP2012/071065, filed on Oct. 24, 2012.

(51) Int. Cl.
*G06F 15/16* (2006.01)
*H04L 29/06* (2006.01)
*H04W 4/06* (2009.01)
*H04W 4/00* (2009.01)

(52) U.S. Cl.
CPC ...... *H04L 65/1003* (2013.01); *H04L 65/4084* (2013.01); *H04L 65/604* (2013.01); *H04L 65/607* (2013.01); *H04W 4/005* (2013.01); *H04W 4/06* (2013.01)

(58) Field of Classification Search
CPC .. H04L 65/604; H04L 65/607; H04L 65/4084
USPC ........................................................ 709/231
See application file for complete search history.

(56) References Cited

U.S. PATENT DOCUMENTS

2012/0259994 A1* 10/2012 Gillies ............... H04L 12/1881
709/231

FOREIGN PATENT DOCUMENTS

| KR | 20110026117 A | 3/2011 |
| KR | 20110037670 A | 4/2011 |
| KR | 20110064093 A | 6/2011 |

OTHER PUBLICATIONS

Paila et al; Flute—File Delivery over Unidirectional Transport; RFC 3926 Network Working Group / Internet Society; Oct. 2004; all pages.*
Luby, M., et al., "Asynchronous Layered Coding (ALC) Protocol Instantiation," RFC 3450, Dec. 2002, 34 pages.
Luby, M., et al., "Layered Coding Transport (LCT) Building Block," RFC 3451, Dec. 2002, 26 pages.
Paila, T., et al., "Flute—File Delivery over Unidirectional Transport," RFC 3926, Oct. 2004, 35 pages.

(Continued)

*Primary Examiner* — Glenford Madamba
(74) *Attorney, Agent, or Firm* — Conley Rose, P.C.

(57) ABSTRACT

A communication receiver, comprising a first client being configured for reception according to the dynamic adaptive streaming over the hypertext transfer protocol (DASH), and a second client being configured for reception according to the File Delivery over Unidirectional Transport (FLUTE) protocol, wherein the first client is configured to provide a retrieve pattern to the second client, and wherein the second client is configured to retrieve a media content according to the retrieve pattern.

11 Claims, 3 Drawing Sheets

(56) References Cited

OTHER PUBLICATIONS

"Infromation technology—Dynamic adaptive streaming over HTTP (DASH)—Part 1: Media presentation description and segment formats, Technical Corrigendum 1," ISO/IEC JTC 1/SC 29/WG 11, Aug. 14, 2012, 75 pages.
"3rd Generation Partnership Project; Technical Spevification Group Services and System Aspects; Transparent end-to-end Packet-switched Streaming Service (PSS); Protocols and codecs (Release 11)," 3GPP TS 26.234, V11.1.0, Technical Specification, Sep. 2012, 172 pages.
"3rd Generation Partnership Project; Technical Specification Group Services and System Aspects; Transparent end-to-end packet switched streaming service (PSS); 3GPP file format (3GP) (Release 11)," GPP TS 26.244, V11.1.0, Technical Specification, Sep. 2012, 60 pages.
"3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 10)," 3GPP TS 26.247, V10.2.0, Technical Specification, Jun. 2012, 110 pages.
"MBMS Profile for Transport Descriptor in MPD," Change Request, 3GPP TSG-SA4 Meeting #70, S4-121047, Aug. 13-17, 2012, 8 pages.
"Proposal on Transport-Specific Signaling in MPD," Change Request, 3GPP TSG-SA4 Meeting #69, S4-121048, May 21-25, 2012, 13 pages.
"3rd Generation Partnership Project; Technical Specification Group Services and System Aspects; Multimedia Broadcast/Multicast Service (MBMS); Protocols and codecs (Release 11)," 3GPP TS 26.346, V11.2.0, Technical Specification, Sep. 2012, 158 pages.
Foreign Communication From a Counterpart Application, PCT Application No. PCT/EP2012/071065, International Search Report dated Jul. 5, 2013, 5 pages.
Foreign Communication From a Counterpart Application, PCT Application No. PCT/EP2012/071065, Written Opinion dated Jul. 5, 2013, 7 pages.
Machine Translation and Abstract of Korean Publication No. KR20110026117, dated Mar. 15, 2011, 20 pages.
Machine Translation and Abstract of Korean Publication No. KR20110037670, dated Apr. 13, 2011, 27 pages.
Machine Translation and Abstract of Korean Publication No. KR20110064093, dated Jun. 15, 2011, 33 pages.
Foreign Communication From a Counterpart Application, Chinese Application No. 201280076193.8, Chinese Office Action dated Sep. 30, 2017, 5 pages.
Foreign Communication From a Counterpart Application, Chinese Application No. 201280076193.8, Chinese Search Report dated Sep. 30, 2017, 1 pages.

* cited by examiner

COMMUNICATION RECEIVER

CROSS-REFERENCE TO RELATED APPLICATION

This application is a continuation of International Application No. PCT/EP2012/071065, filed on Oct. 24, 2012, which is hereby incorporated by reference in its entirety.

BACKGROUND OF THE INVENTION

The present invention relates to the field of multimedia media content delivery.

For multimedia content delivery, media presentation description (MPD) of dynamic adaptive streaming over hypertext transfer protocol (HTTP) (Dynamic Adaptive Streaming over HTTP or DASH) can be used, specified in $3^{rd}$ Generation Partnership Project (3GPP) technical specification (TS) 26.247, which appeared earlier as part of the Packet-Switched Streaming (PSS) service, 3GPP TS 26.234.

In order to deliver files over the internet, also the File Delivery over Unidirectional Transport (FLUTE) [Request for Comments (RFC) 3926] can be used. FLUTE is a protocol for unidirectional delivery of files over the Internet. The specification builds on Asynchronous Layered Coding (ALC) [RFC 3450], the base protocol designed for massively scalable multicast distribution.

For serving large groups with the same media content, the Multimedia Broadcast Multicast Service (MBMS) can be employed. The MBMS Download Delivery Method is designed to deliver an arbitrary number of objects via MBMS to a large receiver population. Two delivery methods are defined in MBMS, 3GPP TS 26.346, namely download and streaming.

MBMS download delivery method uses the FLUTE protocol [RFC 3926] when delivering media content over MBMS bearers.

DASH as defined in 3GPP TS 26.247 specifies formats and methods that enable the delivery of streaming service(s) from standard HTTP servers to DASH client(s). It involves the description of a collection of media segments and auxiliary metadata (all referenced by HTTP-uniform resource locators (URLs)) through a MPD.

The download delivery method, i.e. MBMS, allows the delivery of DASH segments and MPDs as defined in 3GPP TS 26.247. Segment URLs are described using FLUTE.

The network may announce the usage of MBMS download delivery method for providing the Media Segments for DASH through the MBMS User Service Description. In such an event, the MBMS User Service Description fragment shall include a MPD element. This element contains a reference to a MPD metadata fragment as defined in 3GPP TS 26.247. Consequently, the User Equipment (UE) can expect that the files provided with the MBMS download delivery method are formatted according to the 3GP file format for DASH as specified in 3GPP TS 26.244. Furthermore, the MPD fragment may contain reference(s) to Initialisation Segment Description fragment(s) as defined in 3GPP TS 26.247.

In order to start consuming a DASH service delivered over MBMS, an MBMS client has to perform the following steps:

Receive the User Service Bundle Description.
Map the MPD to the corresponding Delivery Method.
Set-up the reception of MBMS user service data.
Receive File Delivery Table (FDT) instance from ALC/layered coding transport (LCT) session.
Map the URL of the chosen representation to the Transport Object Identifier (TOI) using received FDT instance.
Store the received object in the UE cache, which can be fetching by DASH client using GET request.

In the process of initializing DASH media content reception transmitted over MBMS a reception of the FDT instance introduces delay which negatively impacts the quality of experience. Before any segment ('object') of the chosen representation is received from the MBMS session, an FDT instance must first be received. An FDT instance is transmitted periodically over the ALC/LCT session. The introduced delay depends on the time interval the FDT instance is sent on.

Delivering DASH media content over MBMS for devices that support MBMS reception may be performed by operating a FLUTE client in one of the supported modes. The FLUTE client supports 2 operation modes:

Download-all mode: in this mode the FLUTE client is instructed to download all files (transport objects) in the session, or Request-based mode: in this mode the FLUTE client is instructed about which files the FLUTE client should download.

However, by the time the DASH client sends the request for a media segment, it might be already being transmitted over the FLUTE session (ALC/LCT session) or the transmission might be already over. This can cause additional delays to enable the FLUTE client to recover the file.

On the other hand, the Download-all mode may not be appropriate in all scenarios as the FLUTE client will download all file sent over the session and this would lead to excessive storage usage, especially when multiple representations are transmitted simultaneously over the same MBMS session.

SUMMARY

It is therefore an object of the disclosure to provide an efficient concept for multimedia media content delivery.

This object is achieved by the features of the independent claims. Further implementation forms are apparent from the dependent claims, the description and the figures.

According to a first aspect, the disclosure relates to a communication receiver, comprising a first client being configured for reception according to the dynamic adaptive streaming over the HTTP and a second client being configured for reception according to the FLUTE protocol, wherein the first client is configured to provide a retrieve pattern to the second client, and wherein the second client is configured to retrieve, e.g. receive or download or extract, media content according to the retrieve pattern.

In a first implementation form of the first aspect, the first client is configured to provide the retrieve pattern to the second client 205 over a control channel.

In a second implementation form of the first aspect as such or of the first implementation form of the first aspect, the second client is configured to download the media content from a remote transmitter according to the retrieve pattern over a FLUTE session in order to receive the media content.

In a third implementation form of the first aspect as such or of one of the preceding implementation forms of the first aspect, the first client is configured to receive a MPD comprising the retrieve pattern from a remote transmitter, and to retrieve the retrieve pattern from the received MPD.

In a fourth implementation form of the first aspect as such or of one of the preceding implementation forms of the first aspect, the media content is a transport object according to the FLUTE protocol, the transport object being identifiable by a TOI value. The transport objects can be segments of one Representation or Sub-Representation of a dynamic adaptive streaming over the HTTP media content.

In a fifth implementation form of the first aspect as such or of one of the preceding implementation forms of the first aspect, the retrieve pattern comprises a prefix of transport object URLs of the media content, in particular a URL of a set of transport objects. The retrieve pattern can be based in a prefix of the transport object URL, for example being the path of the URL.

In a sixth implementation form of the first aspect as such or of one of the preceding implementation forms of the first aspect, the retrieve pattern comprises a TOI range of TOI values or a prefix of TOI values.

In a seventh implementation form of the first aspect as such or of one of the preceding implementation forms of the first aspect, the retrieve pattern comprises URL of the media content.

In an eighth implementation form of the sixth or seventh implementation form of the first aspect, the TOI range or the prefix of TOI values, or the prefix of transport object URLs, represent segments of a representation of a MPD. The TOI range can be extracted from the extended MPD.

In an ninth implementation form of the eighth implementation form of the first aspect, the second client is configured to download a set of segments that are described by TOI values that fall into the TOI range.

In a tenth implementation form of the first aspect as such or of one of the preceding implementation forms of the first aspect, the second client is configured to receive DASH streaming media content.

In a eleventh implementation form of the first aspect as such or of one of the preceding implementation forms of the first aspect, the second client is configured to download a set of segments that match the prefix of TOI values, or that match the prefix of transport object URLs indicated by the first client.

According to a second aspect, the disclosure relates to a communication transmitter, comprising a first transmitter for transmission according to the DASH, and a second transmitter for transmission according to the FLUTE protocol, wherein the first transmitter is configured to provide segments of a MPD for transmission to the second transmitter, and wherein the second transmitter is configured to assign a retrieve pattern to the segments, and wherein the transmitter is configured to transmit an enhanced MPD (101) towards a communication network, the enhanced MPD (101) comprising the retrieve pattern.

In a first implementation form of the second aspect, the first transmitter and the second transmitter are configured to communicate over a control channel.

According to a third aspect, the disclosure relates to a transmission method for transmission by a communication transmitter, the communication transmitter comprising a first transmitter for transmission according to the DASH protocol, and a second transmitter for according to the FLUTE protocol, the method comprising providing segments of a MPD to the second transmitter by the first transmitter, assigning a retrieve pattern to the segments by the second transmitter, and transmitting an enhanced MPD towards a communication network, the enhanced MPD comprising the retrieve pattern.

According to a fourth aspect, the disclosure relates to a reception method for media content reception by a communication receiver, the communication receiver comprising a first client being configured for reception according to the DASH protocol and a second client being configured for reception media content according to the FLUTE protocol, wherein the method comprises providing a retrieve pattern to the second client by the first client, and to receive media content by the second client according to the retrieve pattern.

According to a fifth aspect, the disclosure relates to a program for performing the transmission method or the reception method when executed on a computer.

The disclosure can be implemented in hardware and/or in software.

DETAILED DESCRIPTION OF EMBODIMENTS OF THE INVENTION

Figure 1:
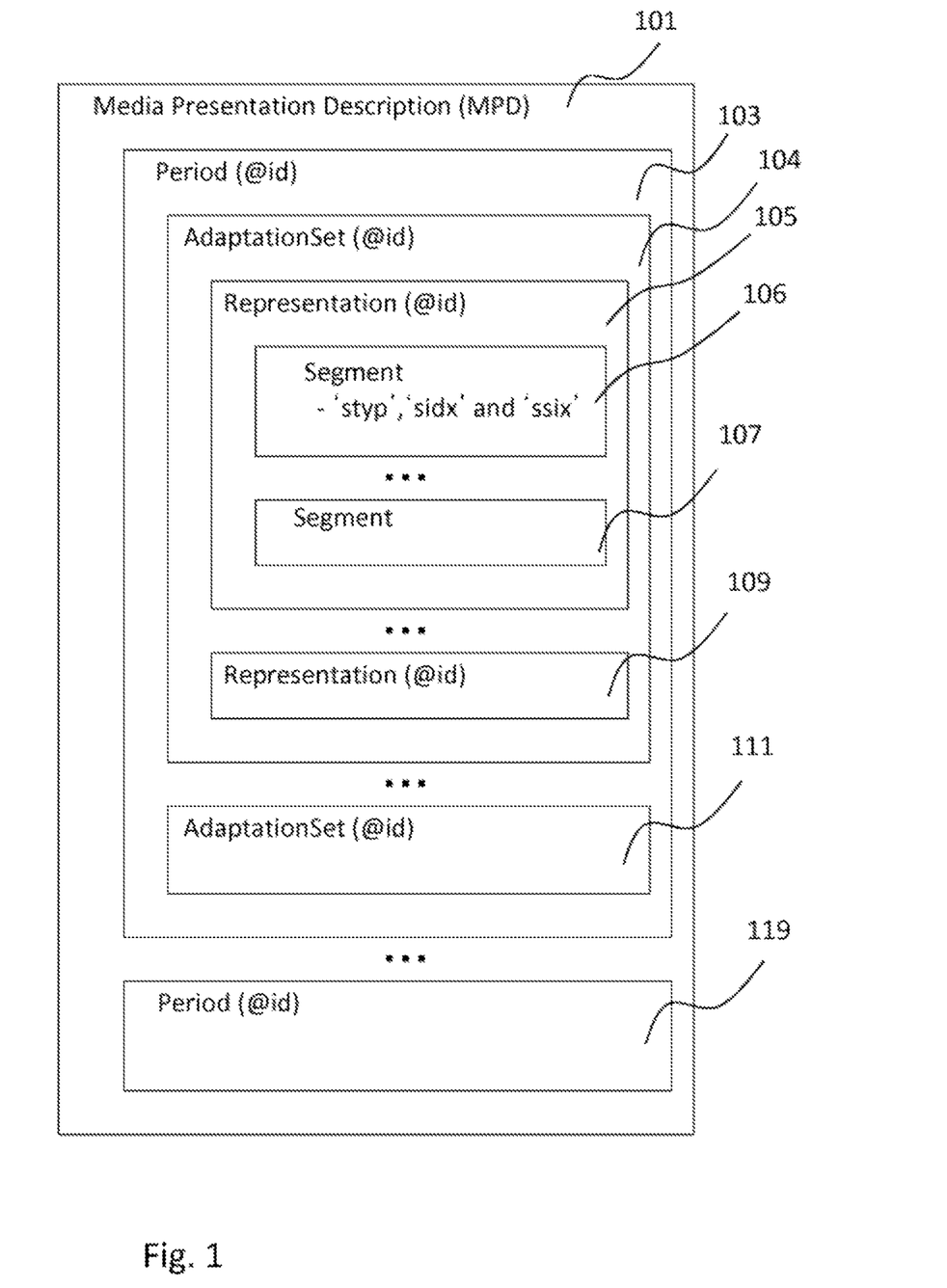
FIG. 1 shows a DASH Data Model.

FIG. 1 shows a MPD 101, which is based on a DASH Data Model implementing the specification 3GPP TS 26.247.

The MPD 101 comprises a sequence of Periods 103, 119 in time that make up the MPD. A Period 103, 119 typically represents a media content period during which a consistent set of encoded versions of the media content is available, i.e. the set of available bitrates, languages, captions, subtitles etc. does not change during a Period.

Within a Period 103, 119, material is arranged into Adaptation Sets 104, 111. An Adaptation Set 104, 111 represents a set of interchangeable encoded versions of one or several media content components. For example, there may be one Adaptation Set 104, 111 for the main video component and a separate one for the main audio component. If there is other material available, for example captions or audio descriptions, then these may each have a separate Adaptation Set 104, 111. Material may also be provided in multiplexed form, in which case interchangeable versions of the multiplex may be described as a single Adaptation Set, for example an Adaptation Set containing both the main audio and main video for a Period. Each of the multiplexed components may be described individually by a media content component description.

An Adaptation Set 104, 111 comprises a set of Representations 105, 109. A Representation 105, 109 describes a deliverable encoded version of one or several media content components. A Representation 105, 109 includes one or more media streams, e.g. one for each media content component in the multiplex. Any single Representation 105, 109 within an Adaptation Set is sufficient to render the contained media content components. Typically, clients may switch from Representation to Representation during a Period in order to adapt to network conditions or other factors. Clients may also ignore Representations that rely on codecs or other rendering technologies they do not support or that are otherwise unsuitable.

Within a Representation 105, 109, the media content may be divided in time into Segments 106, 107. A Segment 106, 107 is the basic unit of data that is advertised in the MPD. A URL is provided for each Segment 106, 107 meaning that a Segment is the largest unit of data that can be retrieved with a single HTTP request.

According to some implementation forms, different timelines can further be defined. One of DASH features is that encoded versions of different media content components share a common timeline. The presentation time of access unit within the media content is mapped to the global common presentation timeline for synchronization of different media components and to enable seamless switching of different coded versions of the same media components. This timeline is referred as Media Presentation timeline. The Media Segments themselves contain accurate Media Presentation timing information enabling synchronization of components and seamless switching.

A second timeline is used to signal to clients the availability time of segments at the specified HTTP-URLs called Segment availability times. These times are provided in wall-clock time and clients typically compare the wall-clock time to Segment availability times before accessing the segments at the specified HTTP-URLs. For On-Demand services with a static MPD, the availability times of all Segments are identical. For live services when the MPD is updated, the availability times of segments depend on the position of the Segment in the Media Presentation timeline.

The Segments 106, 107 can have assigned a duration, which is the duration of the media contained in the Segment when presented at normal speed. Typically, all Segments 106, 107 in a Representation have the same or roughly similar duration. However Segment duration may differ from Representation 105, 109 to Representation 105, 109. A DASH presentation can be constructed with relative short segments (for example a few seconds), or longer Segments including a single Segment for the whole Representation.

Short Segments are usually required in the case of live media content, where there are restrictions on end-to-end latency. The duration of a Segment is typically a lower bound on the end-to-end latency. DASH does not support the possibility for Segments to be extended over time; a Segment is a complete and discrete unit that must be made available in its entirety.

Segments 106, 107 may be further subdivided into Sub-segments each of which contains a whole number of complete access units. If a Segment is divided into Sub-segments, then this division is described by a compact Segment index, which provides the presentation time range in the Representation and corresponding byte range in the Segment occupied by each Sub-segment. Clients may download this index in advance and then issue requests for individual Sub-segments.

Clients may switch from Representation 105, 109 to Representation 105, 109 within an Adaptation Set at any time in the media content.

According to some implementation forms, the MPD 101 can be enhanced about a retrieve pattern indicating to a receiver the media content that can be retrieved. The retrieve pattern can comprise a prefix of the TOI to indicate a range of TOI values, or URL information or can be based on a prefix of the transport object URL, for example being the path of the URL. The retrieve pattern can be indicated as metadata information.

For On-Demand services, the MPD 101 can be a static document describing the various aspects of the Media Presentation. All Segments of the Media Presentation are available on the server once any Segment is available. For live services, however, Segments become available with time as the media content is produced. The MPD may be updated regularly to reflect changes in the presentation over time, for example Segment URLs for new segments may be added to the MPD and those for old, no longer available Segments may be removed. However, if Segment URLs are described using a template, this updating may not be necessary except for some redundancy/failover cases.

Delivering files over the internet can be ruled by the FLUTE protocol described in the RFC 3926. FLUTE builds on the ALC as specified in the RFC 3450. ALC defines transport of arbitrary binary objects. For file delivery applications mere transport of objects is not enough, however. The end systems need to know what the objects actually represent. FLUTE specifies a mechanism for signaling and mapping the properties of files to concepts of ALC in a way that allows receivers to assign those parameters for received objects. Consequently, throughout this document the term 'file' relates to an 'object' as discussed in ALC.

ALC is a protocol instantiation of LTC building block [RFC 3451]. Thus, ALC inherits the session concept of LCT. In the following, the concept ALC/LCT session is exemplarily used to collectively denote the interchangeable terms ALC session and LCT session. An ALC/LCT session consists of a set of logically grouped ALC/LCT channels associated with a single sender sending packets with ALC/LCT headers for one or more objects. An ALC/LCT channel is defined by the combination of a sender and an address associated with the channel by the sender. A receiver joins a channel to start receiving the data packets sent to the channel by the sender, and a receiver leaves a channel to stop receiving data packets from the channel.

One of the fields carried in the ALC/LCT header is the Transport Session Identifier (TSI). The TSI is scoped by the source Internet Protocol (IP) address. The source IP address and TSI pair uniquely identifies a session, i.e., the receiver uses this pair carried in each packet to uniquely identify from which session the packet was received. In case multiple objects are carried within a session, then the TOI field within the ALC/LCT header identifies from which object the data in the packet was generated. Each object is associated with a unique TOI within the scope of a session.

Over an ALC/LCT session (also referred as FLUTE session in this document), a FDT Instances together with TOI fields provides parameters to identify, locate and restore the objects at the receiver.

In each ALC/LCT session, the TOI value '0' is reserved for delivery of FDT Instances. Each object in an ALC/LCT session is associated with a TOI (>0) in the scope of that session.

The FDT provides a means to describe various attributes associated with files that are to be delivered within the file delivery session. Two required attributes are "Content-Location" (URL identifying the object) and associated "TOI" value, the other attributes are optional. The TOI is included in each ALC/LCT data packet during the delivery of the object, and thus the TOI carried in the FDT is how the receiver determines which ALC/LCT data packets contain information about which object. An example of FDT containing mapping between URLs and TOI values is presented below.

```
<?xml version="1.0" encoding="UTF-8"?>
<FDT-Instance xmlns:xsi="http://www.w3.org/2001/XMLSchema-instance"
xmlns:fl="http://www.example.com/flute"
xsi:schemaLocation="http://www.example.com/flute-fdt.xsd"
Expires="2890842807">
<File Content-Location="www.example.com/segment1.mp4"
TOI="1"
Content-Type=" video/mp4"/>
<File Content-Location="www.example.com/segment2.mp4"
TOI="2"
Content-Type=" video/mp4"/>
</FDT-Instance>
```

The delivery of the DASH segments and MPDs shown in FIG. 1 can be based upon the MBMS as defined in in 3GPP TS 26.247.

Figure 2:
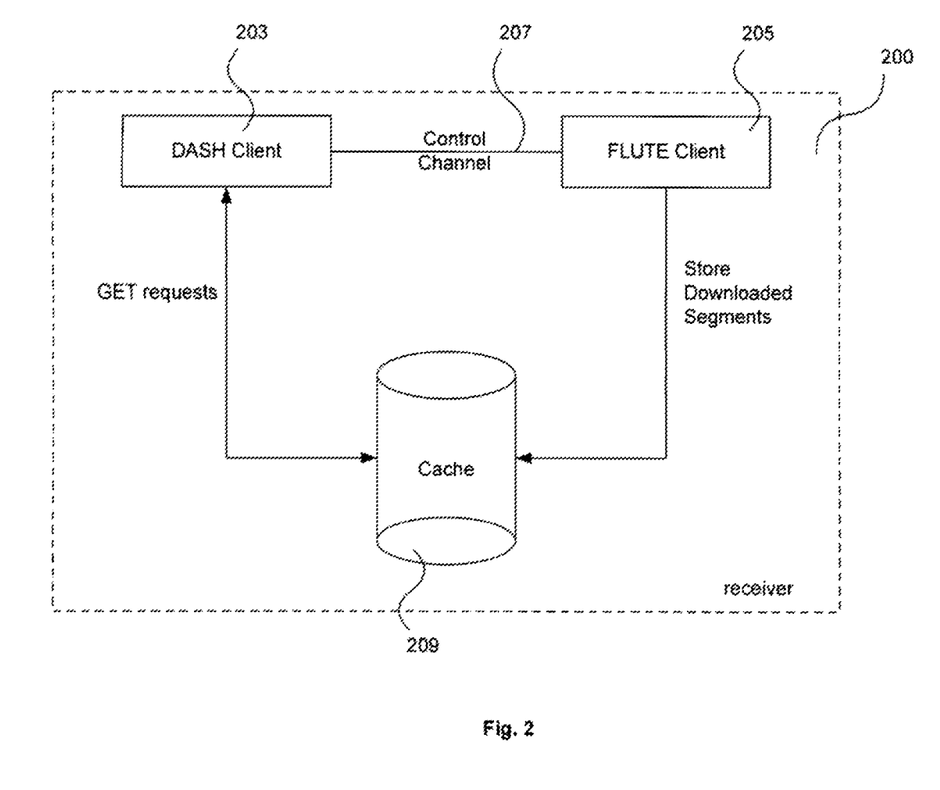
FIG. 2 shows a receiver architecture.

FIG. 2 shows a possible architecture of a receiver 200 for implementing DASH over MBMS according to an implementation form. The receiver 200 comprises a DASH client 203 (first client) and a FLUTE client 205 (second client). The DASH client 203 and the FLUTE client 205 can communicate with each other using the control channel 207. The channel 207 can bi-directionally or uni-directionally connect the DASH client 203 and the FLUTE client 205. Optionally, also the cache 209 can be provided.

According to an implementation form, an additional operation mode is introduced for the FLUTE session, as compared with the existent 3GPP specification.

In the additional mode (retrieve pattern mode), the FLUTE client 205 is instructed to download and reconstruct a set of transport objects based on a certain retrieve pattern. In one embodiment, the retrieve pattern is the prefix of the TOI. In another embodiment, the retrieve pattern is the URL or in the URL of the transport objects, e.g. the path part of the URL.

The retrieve pattern can be signaled to the DASH client 203 and can be used to instruct the FLUTE client 205 to operate in the additional mode.

According to an implementation form, the retrieve pattern can be described in an enhanced MPD, additionally comprising information on the retrieve pattern.

According to an implementation form, a MBMS client not shown in FIG. 2 can start consuming a DASH service delivered over MBMS, and may receive the User Service Bundle Description, map the enhanced MPD additionally comprising the retrieve pattern, e.g. one or more TOI ranges, each TOI range assigned to a specific Representation to the corresponding Delivery Method. Inform a FLUTE client about the retrieve pattern, e.g. about the TOI range for the chosen Representation. Thereafter, the reception of MBMS user service data can be set up.

According to an implementation form, the received object can be stored in the in the UE cache 209, which can be fetched at a later time by DASH client 203 using a GET request.

According to an implementation form, in order to deliver DASH media content over MBMS, the FLUTE client 205 can be operated in one of the following operation modes:

Download-all mode: in this mode the FLUTE client 205 is instructed to download all files (transport objects) in the session, Request-based mode: in this mode the FLUTE client 205 is instructed about which files the FLUTE client should download, or Retrieve pattern mode: In this mode, the FLUTE client 205 is instructed to download and reconstruct a set of transport objects based on a retrieve pattern.

According to an implementation form, the control channel between the DASH client 203 and the FLUTE client 205 is used to communicate the requested segment URLs, when e.g. operating in a request-based mode.

In the Download-all mode, DASH client 203 does not pass any information to FLUTE client 205 over the control channel 207. Thus, the FLUTE client 205 can download all segments transmitted over FLUTE channel and stores them to the cache 209. In particular, the DASH client 203 can send a GET request with the URLs of segments of chosen Representation.

According to some implementation forms, also Multiple Representations can be transmitted over the same FLUTE channel.

In the Request-based mode, the DASH client 203 can inform FLUTE client 205 over the control channel 207 about a URL of a segment of the chosen Representation that DASH client 203 wants to request. The FLUTE client 205 maps the URL to TOI, forming an implementation form of the retrieve pattern, based on information from FDT. Next, the FLUTE client 205 downloads the segment transmitted over FLUTE channel described by the mapped TOI and can store it to cache 209. Next, the DASH client 203 sends GET requests with URL of the segment of chosen Representation. Then, the above steps are repeated in the Request-based mode for the next segment of interest to the DASH client 203.

According to some implementation forms, Segment duration can be even as short as 1 second.

Figure 3:
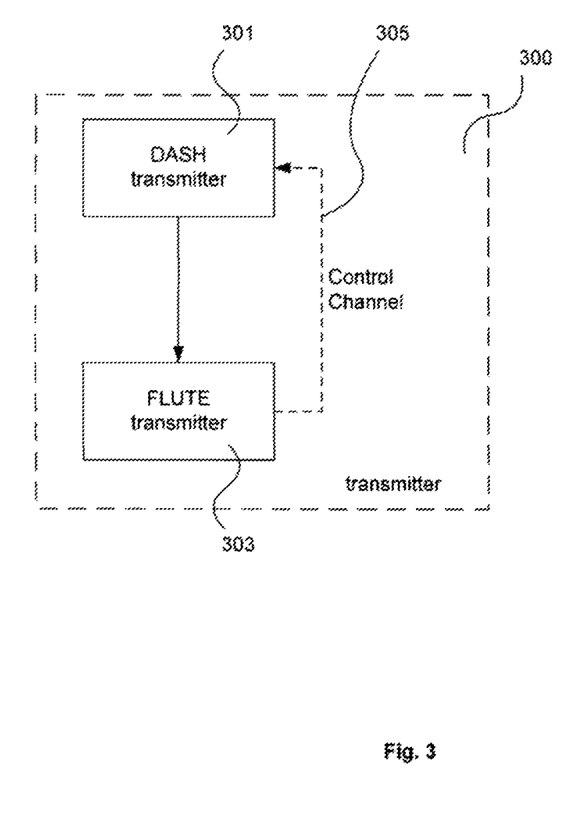
FIG. 3 shows a transmitter architecture.

In the additional retrieve pattern mode, the DASH client 203 informs the FLUTE client 205 over the control channel about the retrieve pattern, e.g. about the TOI range representing all segments of the chosen Representation. The TOI range can be extracted from the extended MPD. The extended MPD can be provided by e.g. the transmitter as shown in FIG. 3. Then, the FLUTE client 205 downloads the segment transmitted over FLUTE channel that are described by the retrieve pattern, e.g. by the TOI value that fall into the TOI range indicated by DASH client 203. The downloaded segments are stored to the cache 209. The DASH client 203 can send GET request with the URLs of segments of chosen Representation.

According to an implementation form, by introducing the additional signaling information (retrieve pattern) about the FLUTE session to the MPD as shown in FIG. 1 to obtain the enhanced MPD, the DASH client 203 and/or the MBMS client can start reception even before the FDT instance is received. Due to this, tune-in time to DASH service delivered over MBMS is reduced.

FIG. 3 shows a transmitter 300 according to an implementation form. The transmitter 300 comprises a DASH transmitter 301 (first transmitter) and a FLUTE transmitter 303 (second transmitter). Further, a control channel between the FLUTE transmitter 303 and the DASH transmitter 301 is provided.

According to an implementation form, the transmitter 300 is configured to create the extended MPD, which can, for example, be used by the receiver as shown in FIG. 2.

According to an implementation form, the DASH transmitter 301 creates segments and MPD metadata information. The DASH transmitter 301 and the FLUTE transmitter 303 can communicate to each other to set up the retrieve pattern, e.g. fix TOI ranges for each Representation 105, 109, as shown in FIG. 1, that can be used by the FLUTE client 205 shown in FIG. 2 and be included in the extended MPD metadata information. The FLUTE transmitter 303 receives the segments and the extended MPD metadata information to be sent over a FLUTE channel from the DASH transmitter 301. The FLUTE transmitter 303 can assign to all segments and MPD metadata information the retrieve pattern, e.g. the TOI values from the fixed TOI range based to which Representation the segments belongs to.

According to some embodiments, the retrieve pattern can be formed by the TOI. In one implementation form, the TOI value or the range of TOI values for a given Adaptation Set, Representation, or Sub-Representation can be signaled in EssentialProperty or SupplementalProperty descriptors.

In order to signal the TOI value or the range of TOI values for a given Adaptation Set, Representation, or Sub-Representation, a value for SchemeIdentifier as well as the syntax and semantics of the value field can be defined. The SchemeIdentifier for announcing a download delivery method can be the uniform resource name (URN) "urn: 3GPP:ns:MBMS:userService:download:2002".

The semantics and XML syntax of the EssentialProperty or SupplementalProperty descriptors scheme with SchemeIdentifier equal "urn:3GPP:ns:MBMS:userService:download:2002" can be as specified in Table 1, 2 and Table 3, respectively.

TABLE 1

Example Semantics

| Element or Attribute Name | Use | Description |
| --- | --- | --- |
| TOIRange | 1 ... N | Sepecifies a range of TOI values |

TABLE 2

Semantics of TOIRangeType

| Element or Attribute Name | Use | Description |
| --- | --- | --- |
| TOIRangeType | | |
| @startTOI | M | The smallest value of the TOI in the range |
| @endTOI | M | The highest value of the TOI in the range |

TABLE 3

Syntax

```
<?xml version="1.0" encoding="UTF-8"?>
<xs:schema
targetNamespace="urn:mpeg:dash:viewpoint:3DVideoInformation"
    attributeFormDefault="unqualified"
    elementFormDefault="qualified"
    xmlns:xs="http://www.w3.org/2001/XMLSchema"
    xmlns:xlink="http://www.w3.org/1999/xlink"
    xmlns=" urn:3GPP:ns:MBMS:userService:download:2002">
    <xs:annotation>
        <xs:appinfo> ALC/LCT session information </xs:appinfo>
        <xs:documentation xml:lang="en">
            This Scheme defines TOI values of interested to Adaptation Set, Representation, or Sub-Representation.
        </xs:documentation>
    </xs:annotation>
    <xs:complexType name="TOI">
        <xs:sequence>
            <xs:element name="TOIRange" type="TOIRangeType" minOccurs="0" axOccurs="unbounded"/>
            <xs:any namespace="##other" processMedia contents="lax" minOccurs="0"axOccurs="unbounded"/>
        </xs:sequence>
    </xs:complexType>
    <xs:complexType name=" TOIRangeType ">
        <xs:attribute name=""startTOI" type="xs: unsignedInteger " use="required"/>
            <xs:attribute name=""endTOI" type="xs: unsignedInteger " use="required"/>
            <xs:anyAttribute namespace="##other" processMedia contents="lax"/>
    </xs:complexType>
</xs:schema>
```

According to some implementation forms, the transmitter 300 shown in FIG. 3 creates the extended MPD metadata information for a DASH service transmitted over a broadcast channel according to the FLUTE protocol. The information on the retrieve pattern in the enhanced MPD can be provided in extended MPD metadata information.

According to some implementation forms, the receiver 200 shown in FIG. 2 is configured to consume a DASH service delivered over a broadcast channel upon the basis of the FLUTE protocol based on the extended MPD metadata information. In particular, the FLUTE client 205 is instructed to retrieve transport objects based on the certain retrieve pattern. The retrieve pattern can be based on a prefix of the TOI, thus indicating a specific range of TOI values, or on a prefix of the transport object URL, for example being the path of the URL. According to some implementation forms, retrieve pattern identifies transport objects that correspond to segments of one Representation or Sub-Representation of a DASH media content.

According to some implementation forms, the FLUTE or ALC/LCT receiver 205 is configured to receive files of a DASH streaming media content.

Many alternatives, modifications, and variations will be apparent to those skilled in the art in light of the above teachings. Of course, those skilled in the art readily recognize that there are numerous applications of the disclosure beyond those described herein. While the present disclosures has been described with reference to one or more particular embodiments, those skilled in the art recognize that many changes may be made thereto without departing from the scope of the present disclosure. It is therefore to be understood that within the scope of the appended claims and their equivalents, the disclosures may be practiced otherwise than as specifically described herein.

What is claimed is:

1. A communication receiver comprising:
   a memory storing executable instructions; and
   a processor coupled to the memory and configured to:
      receive, by a first client in the communication receiver, a media presentation description (MPD) having a retrieve pattern from a remote transmitter, based on dynamic adaptive streaming over the hypertext transfer protocol (DASH), wherein the retrieve pattern comprises a transport object identifier (TOI), TOI range of TOI values, a prefix of TOI values, or a prefix of transport object uniform resource locators (URLs), wherein the TOI range of TOI values, or the prefix of TOI values, or the prefix of transport object URLs represents segments of a chosen representation of the MPD;
      extract, by the first client in the communication receiver, the retrieve pattern from the received MPD;
      provide the retrieve pattern to a second client in the communication receiver configured for reception, based on File Delivery over Unidirectional Transport (FLUTE) protocol; and
      retrieve, by the second client in the communication receiver, a media content by downloading a set of segments that are described by TOI values that fall into the TOI range, or downloading a set of segments that match the prefix of transport object URLs indicated by the first client.

2. The communication receiver according to claim 1, wherein the first client is configured to provide the retrieve pattern to the second client over a control channel.

3. The communication receiver according to claim 1, wherein the second client is configured to download the media content from a remote transmitter according to the retrieve pattern over a FLUTE session in order to receive the media content.

4. The communication receiver according to claim 1, wherein the media content is a transport object according to the FLUTE protocol, and wherein the transport object is identifiable by a TOI value.

5. The communication receiver according to claim 1, wherein the second client is configured to download a set of segments that match the prefix of TOI values.

6. A communication transmitter comprising:
a memory storing executable instructions; and
a processor coupled to the memory and configured to:
  transmit, by a first transmitter in the communication transmitter, segments of a chosen representation of a media presentation description (MPD), based on dynamic adaptive streaming over the hypertext transfer protocol (DASH), to a second transmitter configured for transmission based on File Delivery over Unidirectional Transport (FLUTE) protocol;
  assign, by the second transmitter in the communication transmitter, a retrieve pattern to the segments, and
  wherein the processor in the communication transmitter is further configured to transmit an enhanced MPD towards a communication network, the enhanced MPD comprising the retrieve pattern, wherein the retrieve pattern comprises a transport object identifier (TOI), TOI range of TOI values, a prefix of TOI values, or a prefix of transport object uniform resource locators (URLs), wherein the TOI range of TOI values, or the prefix of TOI values, or the prefix of transport object URLs represents the segments of the chosen representation.

7. The communication transmitter according to claim 6, wherein the first transmitter and the second transmitter are configured to communicate over a control channel.

8. A method for media content transmission, comprising:
  transmitting, by a first transmitter of a communication transmitter, segments of a chosen representation of a media presentation description (MPD) to a second transmitter of the communication transmitter, based on dynamic adaptive streaming over the hypertext transfer protocol (DASH), wherein the second transmitter is configured to transmit media content based on File Delivery over Unidirectional Transport (FLUTE) protocol;
  assigning, by the second transmitter, a retrieve pattern to the segments; and
  transmitting, by the communication transmitter, an enhanced MPD towards a communication network, the enhanced MPD comprising the retrieve pattern, wherein the retrieve pattern comprises a transport object identifier (TOI), TOI range of TOI values, a prefix of TOI values, or a prefix of transport object uniform resource locators (URLs), wherein the TOI range of TOI values, or the prefix of TOI values, or the prefix of transport object URLs represents the segments of the chosen representation.

9. A method for receiving a set of transport objects media content, comprising:
  receiving, by a first client of a communication receiver, a media presentation description (MPD) having a retrieve pattern from a remote transmitter, wherein the first client is configured to receive media content based on dynamic adaptive streaming over the hypertext transfer protocol (DASH) protocol, wherein the retrieve pattern comprises a transport object identifier (TOI), TOI range of TOI values, a prefix of TOI values, or a prefix of transport object uniform resource locators (URLs), and wherein the TOI range of TOI values, or the prefix of TOI values, or the prefix of transport object URLs represents segments of a chosen representation of the MPD;
  extracting, by the first client, the retrieve pattern from the received MPD;
  providing, by the first client, a retrieve pattern to a second client of the communication receiver, wherein the second client is configured to receive media content according to File Delivery over Unidirectional Transport (FLUTE) protocol; and
  receiving, by the second client, media content based on the retrieve pattern by downloading, by the second client, a set of segments that are described by TOI values that fall into the TOI range, or downloading, by the second client, a set of segments that match the prefix of TOI values, or that match the prefix of transport object URLs indicated by the first client.

10. A non-transitory computer-readable medium storing computer program instructions for transmission, that when executed by one or more processors, cause the one or more processors to perform the steps of:
  providing, by a first transmitter of a communication transmitter, a chosen representation of segments of a media presentation description (MPD) to a second transmitter of the communication transmitter, wherein the first transmitter is configured to transmit media content based on dynamic adaptive streaming over the hypertext transfer protocol (DASH) protocol, and the second transmitter is configured to transmit media content based on File Delivery over Unidirectional Transport (FLUTE) protocol;
  assigning a retrieve pattern to the segments by the second transmitter; and
  transmitting an enhanced MPD towards a communication network, the enhanced MPD comprising the retrieve pattern, wherein the retrieve pattern comprises a transport object identifier (TOI), TOI range of TOI values, a prefix of TOI values, or a prefix of transport object uniform resource locators (URLs), wherein the TOI range of TOI values, or the prefix of TOI values, or the prefix of transport object URLs represents the segments of the chosen representation.

11. A non-transitory computer-readable medium storing computer program instructions for communication, that when executed by one or more processors, cause the one or more processors to perform the steps of:
  receiving, by a first client of a communication receiver, a media presentation description, MPD, comprising a retrieve pattern from a remote transmitter; wherein the retrieve pattern comprises a transport object identifier (TOI), TOI, range of TOI values, a prefix of TOI values, or a prefix of transport object uniform resource locators (URLs), wherein the TOI range of TOI values, or the prefix of TOI values, or the prefix of transport object URLs, represent segments of a chosen representation of the MPD;
  extracting, by the first client, the retrieve pattern from the received MPD;
  providing, by the first client, a retrieve pattern to a second client of the communication receiver; and receiving, by the second client, media content based on the retrieve pattern by downloading, by the second client, a set of segments that are described by TOI values that fall into the TOI range, or downloading, by the second client, a set of segments that match the prefix of TOI values, or that match the prefix of transport object URLs indicated by the first client.

* * * * *

UNITED STATES PATENT AND TRADEMARK OFFICE
CERTIFICATE OF CORRECTION

PATENT NO.         : 9,882,937 B2
APPLICATION NO.    : 14/695452
DATED              : January 30, 2018
INVENTOR(S)        : Imed Bouazizi, Giovanni Cordara and Lukasz Kondrad Page 1 of 1

It is certified that error appears in the above-identified patent and that said Letters Patent is hereby corrected as shown below:

On the Title Page

Item (56) Column 2, Line 3-4 U.S. Patent Documents should read:
2012/0259994   A1 10/2012     Gillies, et al. ............ H04L 12/1881
                                                                                                                      709/231

Page 2, Item (56) Column 2, Lines 10-14 Other Publications should read:
"3rd Generation Partnership Project; Technical Specification Group Services and System Aspects; Transparent end-to-end Packet-switched Streaming Service (PSS); Protocols and codecs (Release 11)," GPP TS 26.234, V11.1.0, Technical Specification, Sep. 2012, 172 pages.

Signed and Sealed this
Twenty-ninth Day of May, 2018

Andrei Iancu
*Director of the United States Patent and Trademark Office*